(12) United States Patent
Wu et al.

(10) Patent No.: US 9,391,509 B2
(45) Date of Patent: Jul. 12, 2016

(54) SWITCHING REGULATOR HAVING FAST STARTUP TIME AND LOW STANDBY POWER

(71) Applicant: Active-Semi, Inc., Tortola (VG)

(72) Inventors: Wei-Chung Wu, Richardson, TX (US); Degang Xia, Allen, TX (US); Rulong Jiang, Shanghai (CN)

(73) Assignee: Active-Semi, Inc. (VG)

( * ) Notice: Subject to any disclaimer, the term of this patent is extended or adjusted under 35 U.S.C. 154(b) by 69 days.

(21) Appl. No.: 14/611,025

(22) Filed: Jan. 30, 2015

(65) Prior Publication Data

US 2016/0149484 A1 May 26, 2016

Related U.S. Application Data

(60) Provisional application No. 62/083,211, filed on Nov. 22, 2014.

(51) Int. Cl.
*H02M 3/07* (2006.01)
*H02M 3/335* (2006.01)

(52) U.S. Cl.
CPC ............ *H02M 3/07* (2013.01); *H02M 3/33507* (2013.01)

(58) Field of Classification Search
CPC ......... H02M 3/07; H02M 3/18; H02M 3/335; H02M 3/33507
See application file for complete search history.

(56) References Cited

U.S. PATENT DOCUMENTS

| | | | | |
|---|---|---|---|---|
| 6,044,002 A | * | 3/2000 | Van Der Wal | H02M 3/33523 363/21.16 |
| 7,443,050 B2 | * | 10/2008 | Ito | H02M 3/33561 307/10.8 |
| 2014/0185333 A1 | * | 7/2014 | Yang | H02M 3/33569 363/21.12 |

* cited by examiner

*Primary Examiner* — Matthew Nguyen
(74) *Attorney, Agent, or Firm* — Imperium Patent Works; Daniel D. Tagliaferri

(57) ABSTRACT

A switching regulator having fast start-up time and low standby power is disclosed. In an exemplary embodiment, an apparatus includes a transistor that generates a charging current at a first current level from a base current received at a base terminal. The apparatus also includes a capacitor that charges in response to the charging current at the first current level to generate a voltage signal that increases at a first rate. The apparatus also includes a charge pump having an output coupled to the base terminal. The charge pump outputs a charge pump current when the voltage signal exceeds a first voltage level. The base current is increased by charge pump current to cause the transistor to generate the charging current at a second current level, and the capacitor charges in response to the charging current at the second current level to generate the voltage signal that increases at a second rate.

20 Claims, 5 Drawing Sheets

SWITCHING REGULATOR HAVING FAST STARTUP TIME AND LOW STANDBY POWER

CLAIM OF PRIORITY UNDER 35 U.S.C. §119

The present application for Patent claims priority to U.S. Provisional Application having Application No. 62/083,211, entitled "SWITCHING REGULATOR HAVING FAST STARTUP TIME AND LOW STANDBY POWER" filed Nov. 22, 2014, assigned to the assignee hereof and expressly incorporated herein by reference.

TECHNICAL FIELD

The disclosed embodiments relate to the field of power conversion, and more specifically, to switching regulators in power supply circuits.

BACKGROUND INFORMATION

A circuit known as a flyback converter is a switch mode power supply circuit commonly used in applications such as AC-to-DC wall adapter power supplies and battery chargers.

FIG. 1 shows a block diagram of a conventional flyback converter 100 that is controlled from a primary side and that operates in an emitter switching configuration. Flyback converter 100 includes a transformer 102 that has primary, secondary, and auxiliary windings. On the primary side, flyback converter 100 includes resistor 104, capacitor 106, switcher circuit 108, transistor switch 110, and diode 112. On the secondary side, flyback converter 100 includes a secondary rectifier 114, a bleed resistor 116, and an output capacitor 118. An alternating current (AC) line voltage may, for example, be rectified by a full wave bridge rectifier (not shown) and an associated smoothing capacitor (not shown) so that the rectified and smoothed rough DC voltage is present at terminal Vin.

Flyback converter 100 operates by repeatedly closing and opening the switch 110. Closing the switch 110 causes a current to flow from the terminal Vin, through the primary side windings (having Np number of windings) of the transformer 102, through the switch 110, and into the SW terminal of the switcher circuit 108. Within the switcher circuit 108, the current is routed to flow out of a current sense (CS) terminal. Opening the switch 110 causes voltage at the dot end of the secondary side windings (having Ns number of windings) to swing positive, which causes current flow to the output capacitor to produce an output voltage at terminal Vout. In one example, a rough DC voltage is present on the secondary side of transformer 102 at output voltage terminal Vout. The switcher circuit 108 controls the closing and opening of switch 110 during operation.

The start-up (or power-up) time of the flyback converter 100 is a measure of the time it takes to obtain a desired regulated output voltage at the terminal Vout. During start-up, the voltage at terminal Vout rises from zero (0) volts to the desired regulated output voltage. The start-up time depends on the RC time constant of the system. The RC time constant is the product of the resistance of resistor 104 and the capacitance of capacitor 106. Resistor 104 and capacitor 106 provide the initial start-up energy for switcher circuit 108. Once the Flyback converter is stable, switcher circuit 108 is powered by the auxiliary side winding (with Na number of turns) of transformer 102 via rectifier 112.

Standby mode occurs when a rectified input voltage is present at terminal Vin but no device draws power from terminal Vout. Power consumption during standby mode depends inversely on the resistance of resistor 104. Capacitor 106 is used to start-up the flyback converter 100 by supplying enough current to the base terminal of transistor 110 to switch current through the transformer and also to provide a bias voltage to switcher circuit 108 prior to the auxiliary winding supplying power to switcher circuit 108. Large values of resistance of resistor 104 and capacitance of capacitor 106 result in a large RC time constant and a long start-up time. However, smaller values of the resistor 104 result in larger standby power utilization.

FIG. 2 shows a graph 200 that illustrates an approximate voltage waveform at terminal VDD during start-up. In the graph 200, the voltage at terminal VDD rises slowly based on the RC time constant until a turn-on threshold is reached at time T1. For example, the start-up time may be approximately 2.5 seconds. Unfortunately, in some applications, this long start-up time is not acceptable. If the start-up time is decreased by decreasing the resistor 104, then the standby power utilization will correspondingly increase, which may be undesirable.

Therefore, it is desirable to have a switching regulator that provides fast start-up times and low standby power utilization.

BRIEF DESCRIPTION OF THE DRAWINGS

The accompanying drawings, where like numerals indicate like components, illustrate exemplary embodiments of the invention.

DETAILED DESCRIPTION

Reference will now be made in detail to exemplary embodiments of the invention, examples of which are illustrated in the accompanying drawings.

Figure 1:
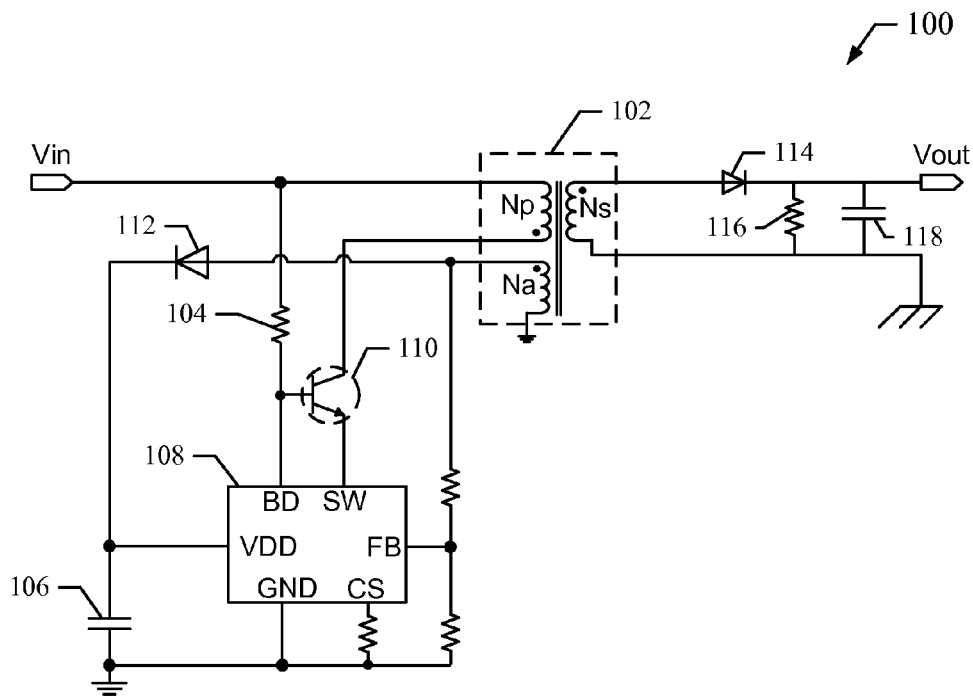
FIG. 1 shows a block diagram of a conventional flyback converter that is controlled from a primary side and that operates in an emitter switching configuration.
Figure 2:
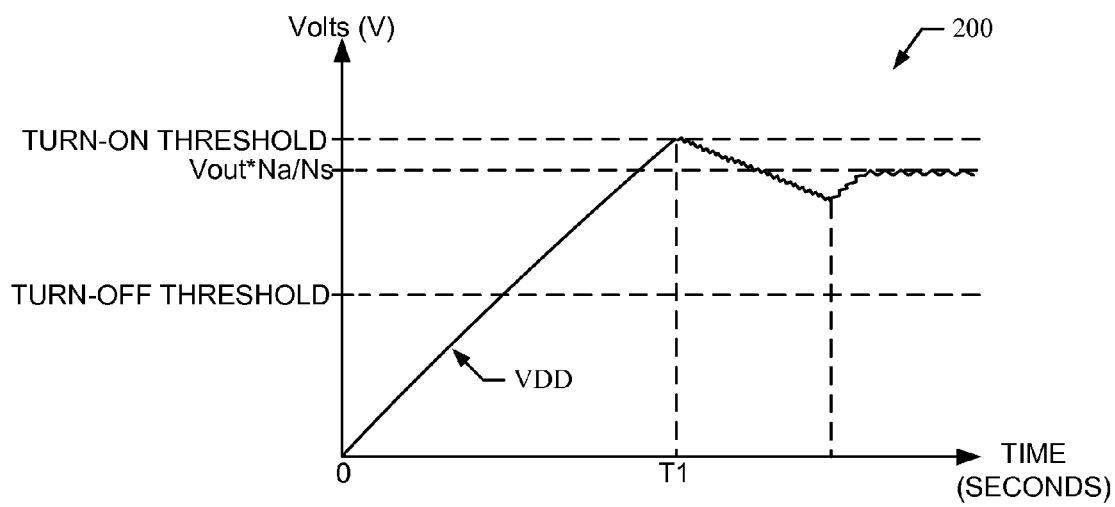
FIG. 2 shows a graph illustrating the operation of the conventional flyback converter shown in FIG. 1.
Figure 3:
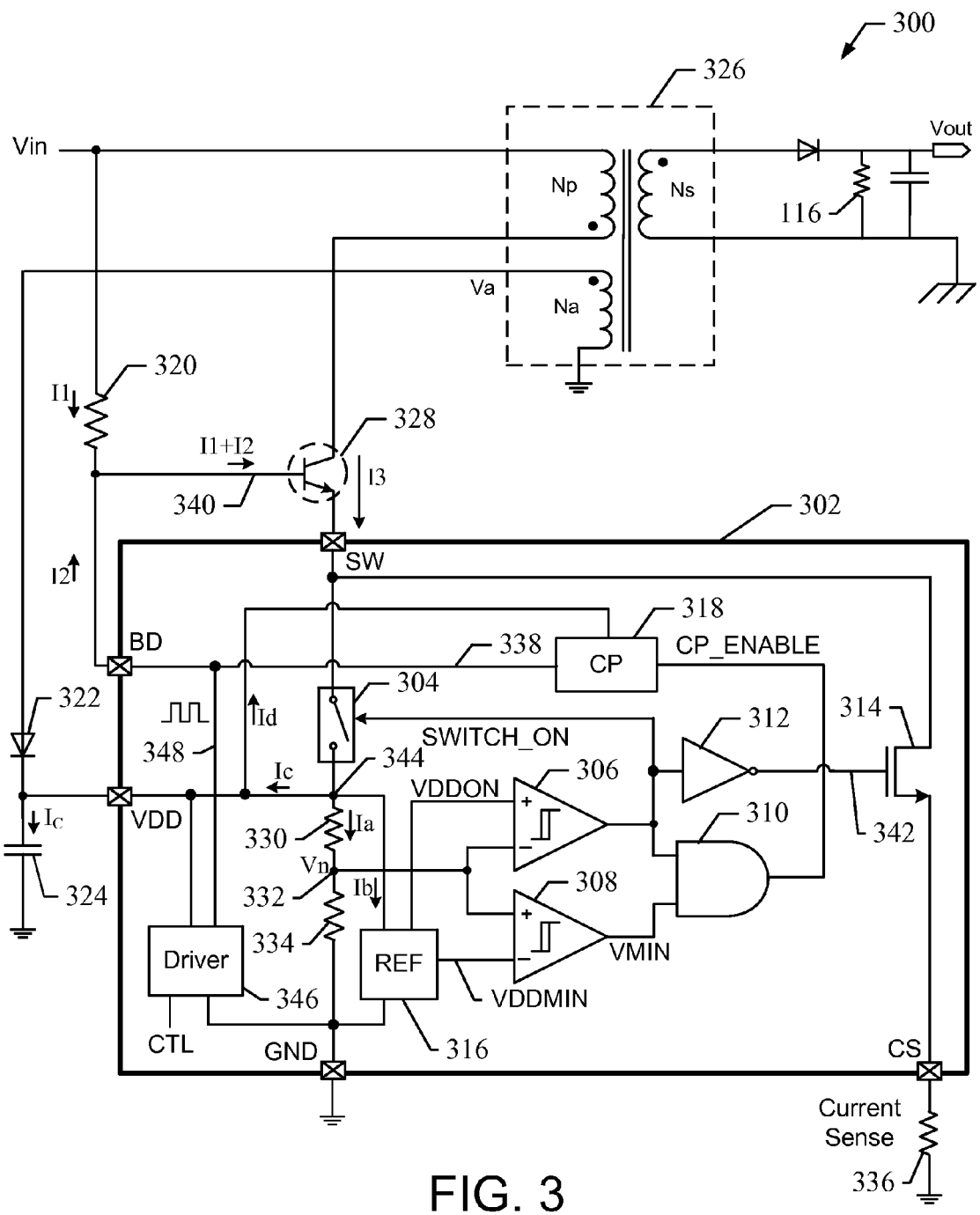
FIG. 3 shows an exemplary embodiment of switching regulator system that provides fast start-up time and low standby power utilization.

FIG. 3 shows an exemplary embodiment of switching regulator system 300 that provides fast start-up time and low standby power utilization. The regulator system 300 comprises regulator circuit 302 having switch 304 and a threshold circuit comprising first comparator 306, second comparator 308, and "AND" gate 310. The regulator circuit 302 also comprises inverter 312, transistor 314, reference voltage generator 316, and charge pump (CP) 318.

The regulator system 300 includes a power transistor 328 that has an emitter terminal that is connected to a switch terminal (SW) of the regulator 302. The transistor 328 also has a collector terminal that is connected to a second terminal of a primary winding (having Np turns) of a transformer 326. A base terminal of the transistor 328 is connected to a base drive terminal (BD) of the regulator 302. In an exemplary embodiment, the transistor 328 is an NPN bipolar power transistor that amplifies (or multiplies) the current at its base terminal by a factor of (β+1) to generate a charging current (I3). The variable β is the gain or amplification factor of the transistor 328. An input voltage (Vin) is input to a first terminal of the primary winding of the transformer 326. The input voltage (Vin) is also input to a first terminal of the resistor 320. A second terminal of the resistor 320 is connected to the base terminal of the transistor 328.

An auxiliary voltage (Va) from an auxiliary winding (having Na turns) of the transformer 326 is input to a VDD terminal of the regulator 302 through a diode 322. The VDD terminal is also connected to a system ground through capacitor 324. The SW terminal of the regulator 302 is connected to a first terminal of the switch 304. A second terminal of the switch 304 is connected to a first terminal 344 of resistor 330 and the VDD terminal. A second terminal of the resistor 330 is connected at node (Vn) 332 to a first terminal of the resistor 334. A second terminal of the resistor 334 is connected to a ground terminal (GND) of the regulator 302 that is connected to a signal ground.

The node (Vn) 332 is connected to an inverting input of the first comparator 306 and a non-inverting input of the second comparator 308. A non-inverting input of the first comparator 306 is connected to receive a reference voltage (VDDON) output from the reference voltage generator 316. An inverting input of the second comparator 308 is connected to receive a reference voltage (VDDMIN) that is also output from the reference voltage generator 316. In an exemplary embodiment, the reference voltage generator 316 is a band-gap voltage reference, but any suitable reference voltage generator may be utilized.

The first comparator 306 performs a comparison of the signals at its input terminals to generate a "SWITCH_ON" signal at its output terminal that is input to a first input terminal of the AND gate 310. The second comparator 308 performs a comparison of the signals at its input terminals to generate a "VMIN" signal at its output terminal that is input to a second input terminal of the AND gate 310. The first 306 and second 308 comparators provide hysteresis to prevent rapid output state changes when their inputs approach the same voltage level. The AND gate 310 performs a logical "AND" operation on the signals received at its input terminals to generate a charge pump enable signal (CP_ENABLE) at its output terminal that is input to the charge pump 318.

The SWITCH_ON signal is input to the inverter 312 and to the switch 304. The inverter 312 inverts the SWITCH_ON signal at its input terminal to generate an inverted SWITCH_ON signal 342 at its output terminal. The inverted SWITCH_ON signal 342 is input to a gate terminal of the transistor 314. A drain terminal of the transistor 314 is connected to the SW terminal of the regulator 302 and a source terminal of the transistor 314 is connected to a current sense (CS) terminal of the regulator 302, which in an exemplary embodiment is connected to the signal ground through a current sense resistor 336. The state of the SWITCH_ON signal controls the operation of the switch 304 to open and close and also enables and disables the transistor 314.

The charge pump 318 is connected to the VDD terminal of the regulator 302. The charge pump 318 is also connected to receive the CP_ENABLE signal output from the AND gate 310. The charge pump 318 has an output terminal that outputs a CP output signal 338 that is connected to the BD terminal of the regulator 302. The charge pump 318 outputs the CP output signal 338 when the charge pump 318 is enabled by the CP_ENABLE signal and the VDD signal exceeds a minimum voltage level.

The CP output signal 338 provides a current (I2) that flows from the BD terminal of the regulator 302 to the base terminal of the transistor 328. A base current signal 340 is input to the base terminal of the transistor 328 and has a current flow that is a combination of the current (I1) flowing through the resistor 320 and the current I2 that is output by the CP 318.

The regulator 302 also comprises a switching driver 346 that is connected to VDD and ground. The driver 346 receives a control signal (CTL) and in response to the control signal outputs a switching drive signal 348 that is input to the BD terminal. The switching drive signal 348 drives the base of the transistor 328 to switch current through the transistor 328 and the primary winding of the transformer 326 during active mode operation.

Figure 4:
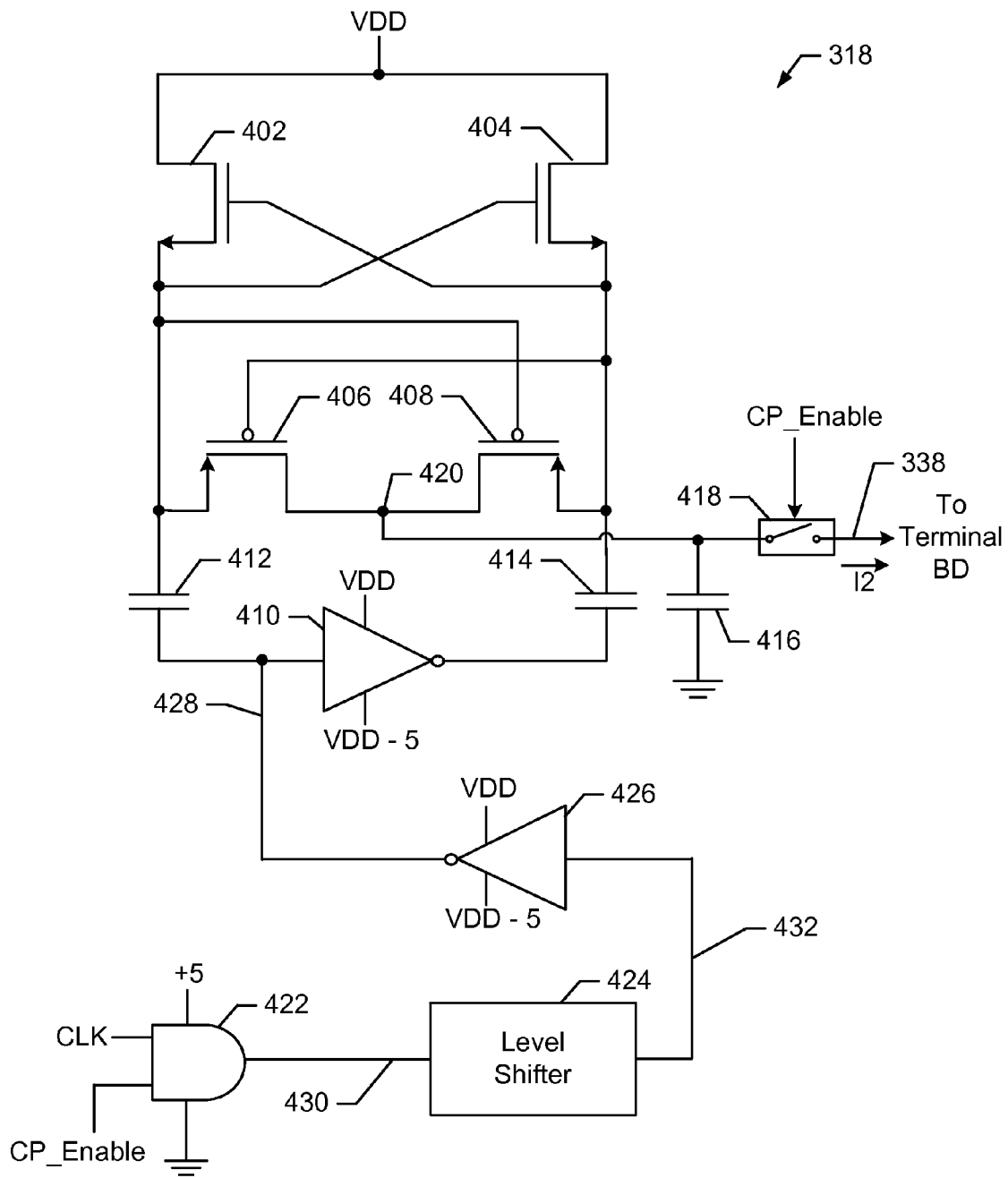
FIG. 4 shows a detailed exemplary embodiment of a charge pump shown in FIG. 3.

FIG. 4 shows a detailed exemplary embodiment of the charge pump 318 shown in FIG. 3. When enabled by the CP_ENABLE signal, the charge pump 318 generates the CP output signal 338 having a voltage level that is approximately 5 volts greater than the voltage VDD. In an exemplary embodiment, the current I2 output from the charge pump 318 is set to be greater than the current I1 flowing through the resistor 320, but in other embodiments the currents may be to set to any other current levels. In an exemplary embodiment, the charge pump 318 outputs the current I2 to provide at least 100 uA of output current.

The charge pump 318 comprises a first transistor pair 402 and 404 that have drain terminals connected to VDD. The transistor 402 has a gate terminal connected to a source terminal of the transistor 404 and the transistor 404 has a gate terminal connected to the source terminal of the transistor 402.

A second transistor pair 406 and 408 has drain terminals connected together at node 420. The transistor 406 has a gate terminal connected to the source terminal of the transistor 404. The transistor 408 has a gate terminal connected to the source terminal of the transistor 402. The drain terminal of the transistor 406 is connected to the source terminal of the transistor 402 and the source terminal of the transistor 408 is connected to the source terminal of the transistor 404.

A first capacitor 412 is connected between the source terminal of the transistor 406 and an input of an inverter 410. A second capacitor 414 is connected between an output of the inverter 410 and the source terminal of the transistor 408. The inverter 410 is supplied by VDD and a voltage that is five volts less than VDD (VDD−5).

The node 420 provides an output signal that is connected to a first terminal of a switch 418. The node 420 is also connected to a signal ground through capacitor 416. The switch 418 has a second terminal that outputs the CP output signal 338, which is connected to the BD terminal of the regulator 302.

The CP_ENABLE signal is connected to a first input terminal of AND gate 422. A second input terminal of the AND gate 422 is connected to receive a clock (CLK) signal. The AND gate 422 performs a logical AND function on the signals at its input terminals to generate a gated CP_ENABLE signal (GCPE) 430 at its output terminal. The output terminal of the AND gate 422 is connected to the input terminal of a level shifter 424 that receives the GCPE signal 430 and shifts (or adjusts) the level of the received GCPE signal 430 to produce a level shifted GCPE signal 432. For example, the GCPE signal 430 has a voltage range of zero to five volts and the level shifter 424 adjusts this range to be from VDD−5 to VDD.

The output terminal of the level shifter 424 is connected to an input terminal of an inverter 426. The inverter 426 receives the level shifted GCPE signal 432 and preforms an inversion to produce an inverted level shifted GCPE signal 428 that is connected to the input terminal of the inverter 410.

The CP_ENABLE signal is also connected to a switch control input terminal of the switch 418 to control its operation. The CP_ENABLE signal operates to open and close the switch 418 so that when the switch 418 is in the closed position, the node 420 is connected to the BD terminal of the regulator 302 to pass the CP output signal 338. When the switch is in the open position, the node 420 is disconnected from the BD terminal.

During operation the GCPE signal 430 has a voltage range of 0 to 5 volts, which is level shifted to a voltage range of VDD−5 to VDD volts by the level shifter 424. The level shifted signal 432 is inverted by inverter 426 to generate the inverted level shifted GCPE signal 428 that drives the capacitance at the input of the inverter 410.

When the CLK signal is at a high level, the bottom plate of capacitor 412 is at VDD−5, while the bottom plate of capacitor 414 is driven by buffer inverter 410 to be at the VDD level. Since capacitor 414 is pre-charged to 5V in a previous cycle, its top plate or gate of NMOS switch 402 is at VDD+5. Thus, NMOS 402 is turned on and charges capacitor 412 to VDD or to a 5V difference across its top and bottom plates. At this time, there is a 5V volt difference between the source and gate terminals of the PMOS switch 408 so this switch is turned on. As a result, "VDD+5" flows through switches 408 and 418 to form the CP output signal 338 that drives the BD pin.

At CLK low, the signal 428 drives the bottom plate of capacitor 412 to VDD, while the bottom plate of capacitor 414 is at VDD−5. The top plate of capacitor 412 is at VDD+5 because it is pre-charged to 5V in last cycle, and turns on NMOS switch 404 to charge top plate of 414 to VDD, or 5V across top and bottom plates. At the same time, the PMOS switch 406 is turned on because it has a 5 volt source to gate voltage. Capacitor 412 top plate voltage "VDD+5" flows through switches 408 and 418 to form the CP output signal 338 that drives the BD pin. In an exemplary embodiment, the maximum output current capability is given by the expression; $(5V*C_{CHARGE}*f_{SW})$, where $C_{CHARGE}$ is the capacitance values of either capacitor 412 or capacitor 414 and $f_{SW}$ is the charge pump clock frequency.

Figure 5:
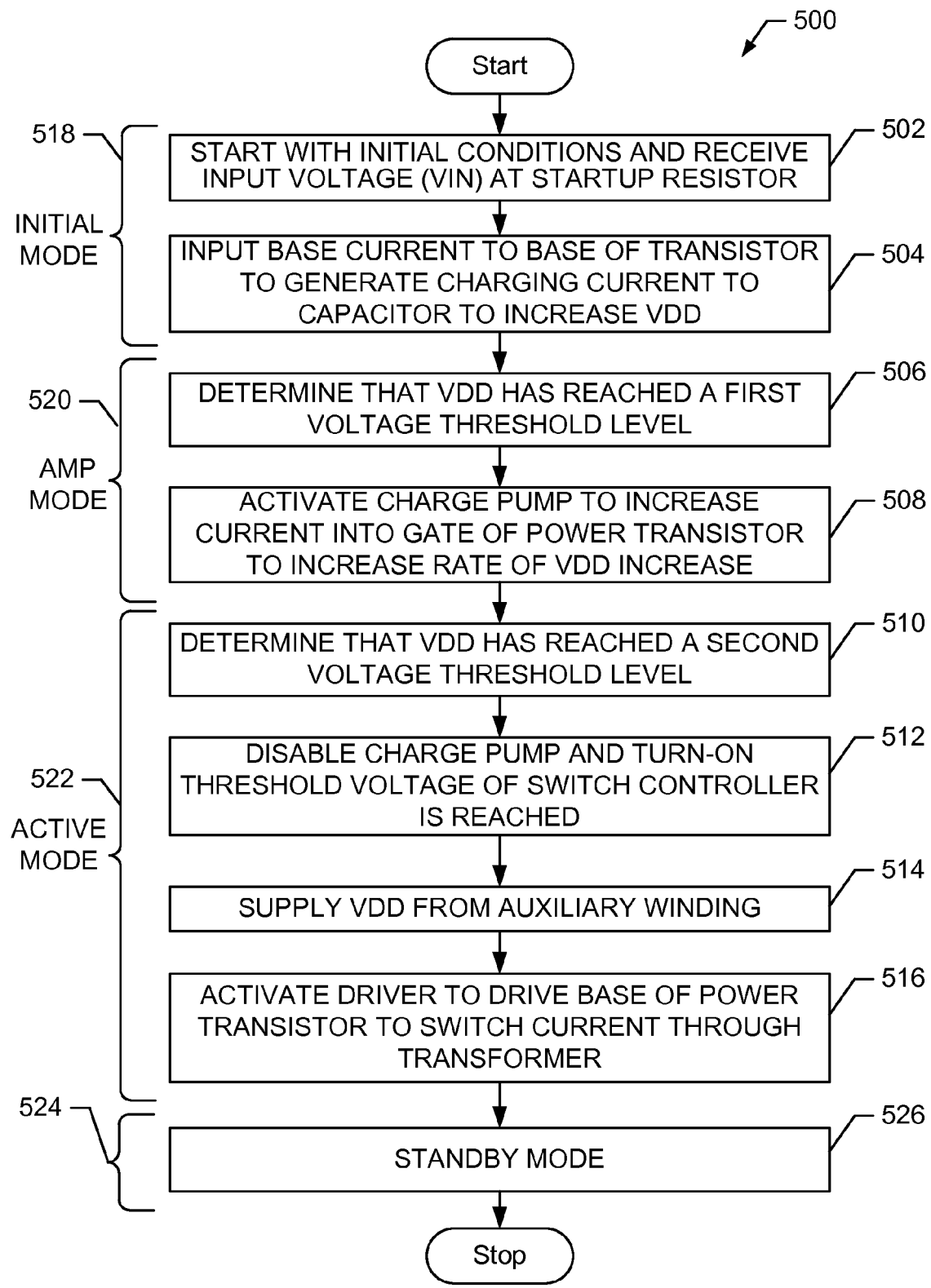
FIG. 5 shows an exemplary embodiment of operations performed by the regulator system to provide fast startup time and low standby power utilization.

FIG. 5 shows an exemplary embodiment of operations 500 performed by the regulator system 300 to provide fast startup times and low standby power utilization. In an exemplary embodiment, the regulator system 300 operates in an initial mode 518, an amplification mode 520, an active mode 522, and a standby mode 524.

Initial Mode

The initial mode 518 begins with operation 502. The regulator system 300 is in an initial state where the switch 304 is closed, the CP 318 is disabled so that the CP output current 338 (I2) is zero, and the voltage VDD is zero. An input voltage (Vin) is received by the regulator system 300. In an exemplary embodiment, the input voltage Vin is a rectified AC voltage that is received at a first terminal of the resistor 320. The input voltage Vin is also input to a first terminal of a primary winding of the transformer 326.

During operation 504, the input voltage Vin causes an input current (I1) to flow through the resistor 320. In an exemplary embodiment, the resistor 320 has a resistance value of approximately 50 MOhms. A combination of the currents I1 and I2 forms the base current 340 that is input to a base terminal of the power transistor 328. Since the current I2 is initially zero, the base current 340 is equal to the input current I1. For example, with Vin approximately equal to 100 volts DC and the resistor 320 selected to provide a resistance of approximately 50 MOhms, the resulting current I1 will be approximately 2 ua.

The base current 340 causes the transistor 328 to generate a charging current (I3) that is output from an emitter terminal of the transistor 328 and flows through the closed switch 304 to node 344. From node 344 the current I3 is divided to flow through additional current paths. For example, from the node 344 a current Ia flows through resistor 330 and a current Ib flows to reference voltage generator 316. A current Ic flows to the capacitor 324 and a current Id flows to the CP 318 when it is enabled. The current $I_c$ charges the capacitor 324 to generate at voltage at the terminal VDD. In an exemplary embodiment, the capacitor 324 has a capacitance value of approximately 4.7 uF.

Since the resistor 320 has a large resistance value, the current (I1) into the base terminal of the transistor 328 is small resulting in a small charging current (I3). For example, during the initial mode the charging current I3 output from the transistor 328 is approximately $I1*(\beta+1)$, where β is the gain or amplification factor of the transistor 328. Thus, if β=10, the charging current I3 will be approximately 22 ua.

Amplification Mode

The amplification mode 520 begins with operation 506. The VMIN signal output from the comparator 308 transitions to a high logic state. This occurs when charging of the capacitor 324 by the charging current Ic causes the voltage VDD to increase such that the voltage Vn at node 332 exceeds the VDDMIN reference voltage. For example, the voltage Vn is approximately equal to [VDD*(R334/(R330+R334)]. In an exemplary embodiment, the resistor 330 has a resistance value of 10 MOhms and the resistor 334 has a resistance value of 2 MOhms. The transition of the VMIN signal causes the CP_ENABLE signal output from the gate 310 also to transition to the high logic state. When the CP_ENBALE signal transitions to the high logic state, the CP 318 is enabled to output the CP output signal 338.

During operation 508, the transition of the CP_ENABLE signal to the high level enables the CP 318 to output the CP output signal 338 with a current level I2 (e.g., 100 ua). The current I2 combines with the input current I1, to increase the base current 340 that flows into the transistor 328. The increased base current causes the transistor 328 to increase the charging current I3. The increased charging current I3 also results in an increase in the current $I_C$, which charges the capacitor 324 at a faster rate and thereby increases the rate at which the voltage VDD rises. For example, the CP 318 outputs the current I2 to be at least 100 ua. The resulting increased charging current I3 output from the transistor 328 will be at least $(I1+I2)*(\beta+1)$, which is (102*11) resulting in approximately 1120 ua. Assuming the efficiency of the CP 318 is 30%, the CP 318 will consume approximately 300 uA to generate the current I2 of 100 uA. The resulting current Ic will be approximately (1320−300)=1020 uA as compared to the 22 uA before the CP 318 is enabled. Thus, the CP 318 provides a substantial increase in the current Ic and the rate at which the capacitor 324 charges, thereby reducing the start-up time of the regulator system 300.

Active Mode

The active mode 522 begins at operation 510, when the voltage Vn exceeds the second reference voltage VDDON. When this occurs, the SWITCH_ON signal output from the comparator 306 transitions to a low logic level. This transition causes the CP_ENABLE signal output from the gate 310 to transition to the low logic level.

During operation 512, the transition of the SWITCH_ON signal to the low logic level causes the switch 304 to be placed in an open state, thereby disconnecting the connection between the SW terminal and the VDD terminal. The transition of the CP_ENABLE signal output from the gate 310 to the low logic level causes the CP 318 to be disabled and the current levels of the CP output signal 338 goes to zero. This results in a reduction in the base current 340 down to the level of the input current I1.

During operation 514, output voltage from the secondary winding begins to rise such that the voltage VDD is supported by the voltage Va derived from the auxiliary windings of the transformer 326. The voltage Va is input to the VDD terminal through diode 322. The voltage VDD then approaches a fixed level as the regulator system 300 stabilizes.

During operation 516, the driver 346 is activated by the control signal (CTL) to output the drive signal 348. The drive signal 348 flows through the BD terminal and to the base of the transistor 328. The drive signal 348 switches the transistor 328 on and off to switch current through the primary winding of the transformer 326 to maintain output voltage regulation in response to the load conditions. The control signal (CTL) controls the driver 346 to adjust the timing of the drive signal 348 waveform to maintain a regulated output voltage. In an exemplary embodiment, the driver 346 comprises any suitable driver configured to control the power transistor 328 to switch current through the primary winding. In an exemplary embodiment, the control signal (CTL) is generated by other circuitry not shown in FIG. 3.

Standby Mode

At some time during the active mode, there may be time intervals when no device is connected to the regulated output of the regulator system 300. During these time intervals, the regulator system 300 enters into a standby mode of operation as shown at block 526. During the standby mode, it is desirable to have the power consumption of the regulator system 300 to be as low as possible. During the standby mode, the power consumption of the regulator system 300 is partially determined by the resistance of the resistor 320.

When in standby, there may be a very small load or no load at the transformer output. For the purpose of this description, it will be assumed that the bleeding resistor 116 is present at the transformer output. The driver 346 adjusts the switching frequency to output just enough energy from the secondary winding to support the energy consumed at output node by the bleeding resistor 116 and by the driver 346 and certain components of the regulator 302. The bleeding resistor 116 provides a resistance (e.g., approximately 20 KOhm) at output node and balances the energy it consumes with the energy consumed by the regulator 302, which comes from the auxiliary winding. The energy from the auxiliary winding is also part of the energy transferred from switching the primary side coil.

In standby mode, most functional blocks of the regulator 302 are shut off resulting in approximately 100 uA being drawn from the VDD pin. To provide 5 Volts at the output, the bleeding resistor consumes about 1.25 mW. The start-up resistor 320 consumes about 1.9 mW assuming the line voltage used to generate Vin is at 220V and the resistor 320 has a resistance of approximately 50 MOhm. The regulator 302 consumes about 18.5V×110 uA=2 mW power. The remaining energy from the energy budget (about 10 mW) is lost on the coil parasitic impedance during switching and leakage current of bulky capacitors at the input and output of the transformer 326. Thus, as demonstrated above, the large value of the resistor 320 results fast turn-on times and lower standby power utilization.

Figure 6:
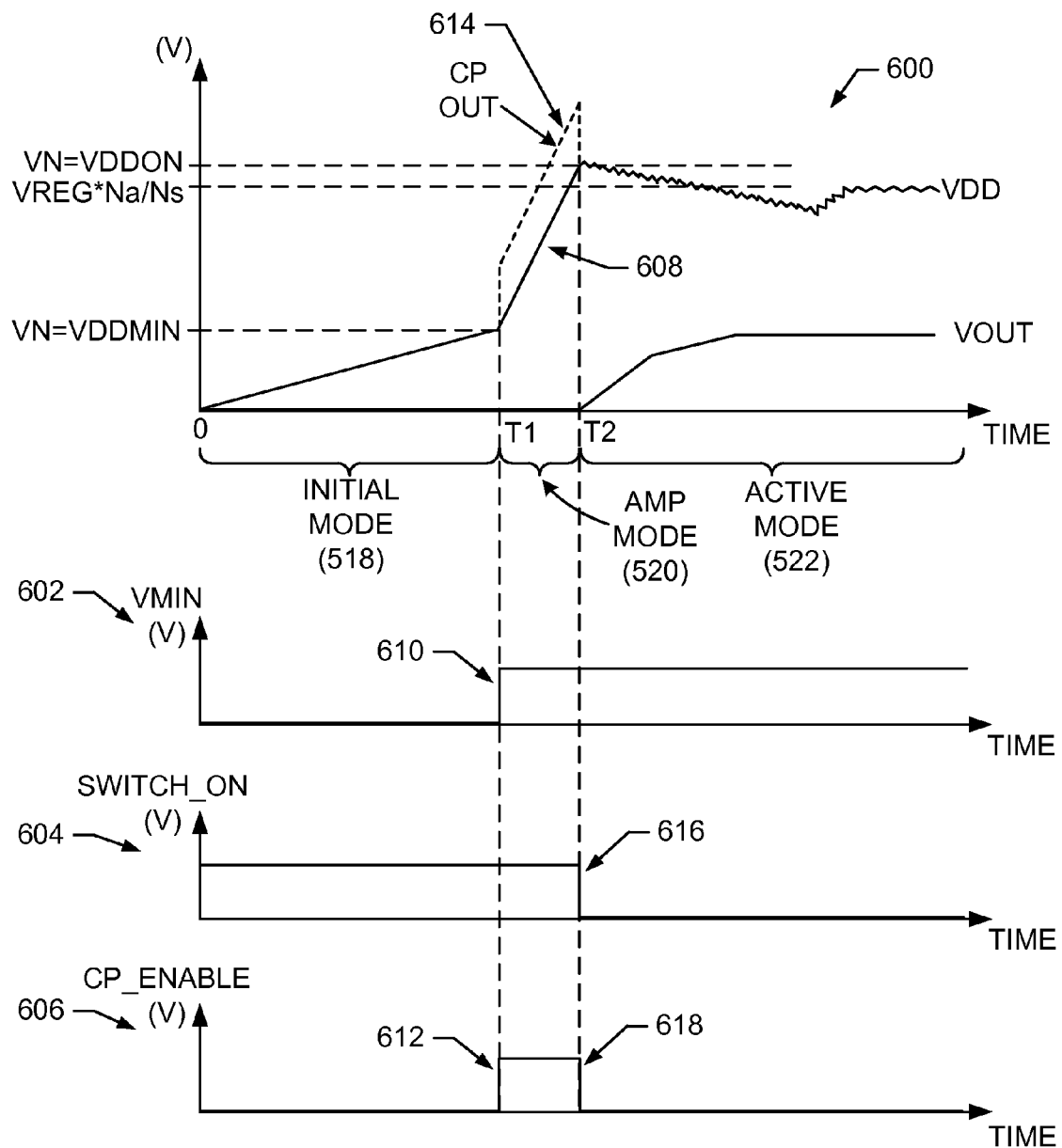
FIG. 6 shows an exemplary embodiment of signal waveforms that illustrate signal timing resulting from operations performed by the regulator system.

FIG. 6 shows an exemplary embodiment of signal waveforms that illustrate signal timing resulting from the operations 500 performed by the regulator system 300. For example, the graph 600 shows a plot of the voltage VDD during the various operating modes described above.

Referring to the graph 600, the initial mode 518 takes places from time 0 to time T1. During the initial mode 518, the switch 304 is in the closed position so that the SW terminal is connected to the VDD terminal. The VMIN signal and the CP_ENABLE signal are at a low logic state, as shown in the graphs 602 and 606. The SWITCH_ON signal is at a high logic state as shown in the graph 604. The above conditions exist until the voltage Vn reaches the VDDMIN reference voltage at time T1. It should be noted that the voltage Vn is proportional to the voltage VDD and is determined by the voltage divider ratio of the resistances R330 and R334.

The amplification mode 520 occurs between time T1 and time T2. At time T1, the VMIN signal transitions from a low logic state to the high logic state as shown at 610. The CP_ENABLE signal also transitions to the high logic state as shown at 612. Thus, between times T1 and T2 the CP_ENABLE signal is at a high logic level, which enables the CP 318 to generate the CP output signal 338 having current level I2. The current level I2 increases the base current 340 to the transistor 328, which results in an increase in the charging current I3. The increase in the charging current I3 results in an increase in the current Ic that charges the capacitor 324. This results in an increase in the rate at which the voltage VDD rises, which is shown at 608 in the graph 600. For example, VDD rises at a first rate during the initial mode 518 and at a higher second rate during the amplification mode 520. The CP output signal 338 has a voltage level that is approximately 5 volts greater than VDD, which is shown by dashed lines at 614.

At the start of the active mode 522, Vn reaches the threshold voltage VDDON and as a result the SWITCH_ON signal transitions from a high logic level to a low logic level, as shown at 616. The CP_ENABLE signal also transitions from a high logic level to the low logic level, as shown at 618. During the active mode 522, the charge pump 318 is disabled and the transistor 314 is enabled to connect signals at the SW terminal to the CS terminal. Also, the driver 346 is enabled to output the drive signal 348 to control the switching operation of the transistor 328.

The exemplary embodiments of a regulator described herein may be implemented on an IC, an analog IC, an RFIC, a mixed-signal IC, an ASIC, a printed circuit board (PCB), an electronic device, etc. The regulator may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

For additional information on the structure and operation of the novel charge pump circuit, see: U.S. Provisional Application having Application No. 62/083,211, entitled "SWITCHING REGULATOR HAVING FAST STARTUP TIME AND LOW STANDBY POWER" filed Nov. 22, 2014 (the entirety of which is incorporated by reference herein).

Accordingly, various modifications, adaptations, and combinations of various features of the described embodiments can be practiced without departing from the scope of the invention as set forth in the claims.

What is claimed is:

1. An apparatus comprising:
 a transistor that generates a charging current at a first current level from a base current received at a base terminal;

a capacitor that charges in response to the charging current at the first current level to generate a voltage signal that increases at a first rate; and a charge pump having an output coupled to the base terminal, the charge pump outputs a charge pump current when the voltage signal exceeds a first voltage level, wherein the base current is increased by the charge pump current and the transistor generates the charging current at a second current level, and wherein the capacitor charges in response to the charging current at the second current level to generate the voltage signal that increases at a second rate.

2. The apparatus of claim 1, further comprising a resistor connected to the base terminal, wherein the resistor receives an input voltage and generates the base current.

3. The apparatus of claim 1, further comprising a threshold circuit that sets an enable signal to a first state when the voltage signal exceeds the first voltage level, and wherein the first state of the enable signal enables the charge pump to generate the charge pump current.

4. The apparatus of claim 3, wherein the threshold circuit sets the enable signal to a second state when the voltage signal exceeds a second voltage level, and wherein the second state of the enable signal disables the charge pump.

5. The apparatus of claim 1, further comprising a switch having a closed position that couples the charging current to the capacitor when the voltage signal is less than a second voltage level, and wherein the switch has an open position that disconnects the charging current from the capacitor when the voltage signal is equal to or greater than a second voltage level.

6. The apparatus of claim 1, further comprising a diode that has an input terminal connected to receive an auxiliary voltage signal and an output terminal that is connected to the capacitor.

7. The apparatus of claim 1, wherein the second current level determines the second rate.

8. The apparatus of claim 7, wherein the second rate determines a start-up time.

9. The apparatus of claim 1, wherein the transistor comprises an NPN power transistor that outputs the charging current at an emitter terminal.

10. The apparatus of claim 1, wherein the transistor generates the charging current by multiplying current at the base terminal by $(\beta+1)$, wherein $\beta$ is a gain factor of the transistor.

11. A method comprising:
generating a charging current at a first current level from an input current;
charging a capacitor in response to the charging current at the first current level to generate a voltage signal that increases at a first rate;
generating a charge pump current when the voltage signal exceeds a first voltage level;
generating the charging current at a second current level from the input current and the charge pump current; and
charging the capacitor using the charging current at the second current level to generate the voltage signal to increase at a second rate.

12. The method of claim 11, further comprising generating the input current using a resistor connected to an input voltage.

13. The method of claim 11, further comprising decreasing the charging current from the second current level to the first current level when the voltage signal exceeds a second voltage level.

14. The method of claim 11, further comprising setting the charge pump current to obtain a selected startup time that begins when the voltage signal exceeds the first reference level and ends when the voltage signal exceeds a second reference level.

15. A system comprising:
a transformer having a primary winding;
a transistor connected to the primary winding, wherein the transistor generates a charging current at a first current level from a base current received at a base terminal;
a capacitor that charges in response to the charging current at the first current level to generate a voltage signal that increases at a first rate; and
a charge pump having an output connected to the base terminal, the charge pump outputs a charge pump current when the voltage signal exceeds a first voltage level, wherein the base current is increased by charge pump current and the transistor generates the charging current at a second current level, and wherein the capacitor charges in response to the charging current at the second current level to generate the voltage signal to increase at a second rate.

16. The system of claim 15, further comprising a threshold circuit that sets an enable signal to a first state when the voltage signal exceeds the first voltage level, and wherein the first state of the enable signal enables the charge pump to generate the charge pump current.

17. The system of claim 16, wherein the threshold circuit sets the enable signal to a second stage when the voltage signal exceeds a second voltage level, and wherein the second state of the enable signal disables the charge pump.

18. The apparatus of claim 15, wherein the charge pump generates the charge pump current at a selected current level to determine the second rate.

19. The apparatus of claim 18, wherein the second rate determines a start-up time.

20. The apparatus of claim 15, wherein the transistor generates the charging current by multiplying the base current by $(\beta+1)$, wherein $\beta$ is a gain factor of the transistor.

* * * * *